H. T. WHITE.
PRUNING-SHEARS.
No. 190,173.                      Patented May 1, 1877.
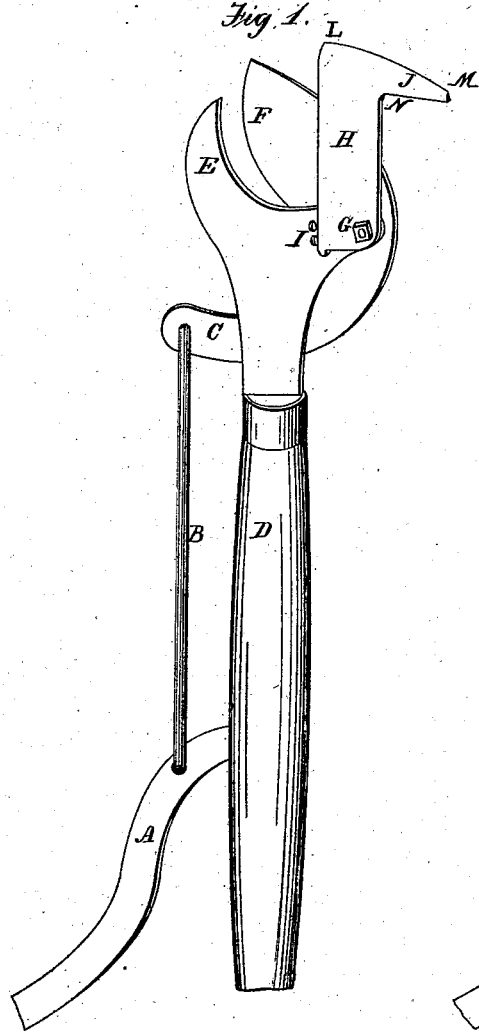
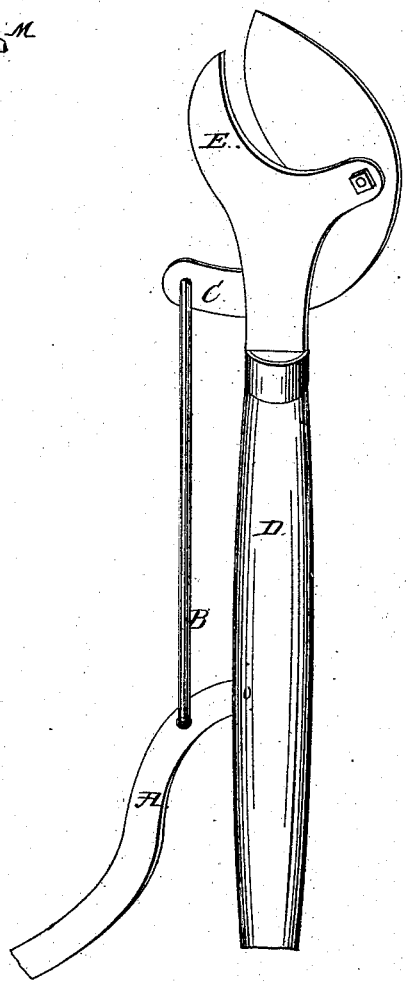
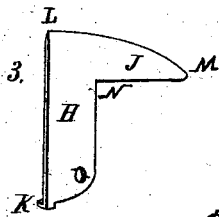
Witnesses
A. D. Wiggins.
Sidney Ogden
Inventor
Henry T. White

UNITED STATES PATENT OFFICE.

HENRY T. WHITE, OF BUFORD, OHIO.

IMPROVEMENT IN PRUNING-SHEARS.

Specification forming part of Letters Patent No. 190,173, dated May 1, 1877; application filed January 19, 1877.

*To all whom it may concern:*

Be it known that I, HENRY T. WHITE, of Buford, Highland county, Ohio, have invented a new and Improved Adjustable Cutter and Hook for Pruning-Shears; and I do hereby declare that the following is a full and exact description of the same.

The nature of my invention consists in attaching a straight-edged adjustable cutter and hook to the fixed blade of pruning-shears, in the manner hereinafter set forth.

To enable others skilled in the art to make and use my invention, I will proceed to describe its construction and operation.

I make my cutter and hook out of steel, iron, or cast-iron, with a straight edge, the reverse side of the cutter serving as a hook, as indicated and shown in the annexed drawing, and to which reference is made as part of this specification, in which—

Figure 1 is a perspective view.

A and D are the handles or levers; B, the connecting-rod; C, the lever of convex jaw; F, the jaw; E, the concave jaw; H, the cutter; J, the hook of cutter; G, the bolt used in fastening adjustable cutter H to the concave jaw E; I, the holes in concave jaw, in which the lug K is inserted to hold or prevent the cutter H from turning or sliding.

Fig. 2 is a view of already patented pruning-shears without my adjustable cutter and hook attached. Fig. 3 is a separate representation of the adjustable cutter and hook.

G is the bolt used to fasten the adjustable cutter and hook, as is shown in Fig. 1. From M to L represents the cutting-edge, and from M to N the hook of the attachment.

I claim—

In combination with the stationary blade of pruning-shears, the detachable hook H, secured by a bolt and lug, K, in the holes in said stationary blade, the hook-edge for cutting on upper side, all as and for the purposes set forth.

HENRY T. WHITE.

Attest:
   A. D. WIGGINS,
   SIDNEY OGDEN.